United States Patent [19]

Williams et al.

[11] Patent Number: 4,660,687
[45] Date of Patent: Apr. 28, 1987

[54] ENERGY ABSORBERS

[75] Inventors: Derrick G. Williams; John J. Bushnell, both of Warwickshire, United Kingdom

[73] Assignee: Oleo International Holding Limited, United Kingdom

[21] Appl. No.: 818,135

[22] Filed: Jan. 13, 1986

[30] Foreign Application Priority Data

Jan. 11, 1985 [GB] United Kingdom ............... 8500693

[51] Int. Cl.$^4$ .......................... F16B 37/08; F16F 9/48
[52] U.S. Cl. ................................... 188/287; 188/317; 213/43; 403/16; 403/259; 411/432; 411/917
[58] Field of Search ............. 188/284, 286, 287, 314, 188/317, 322.22; 267/64.15, 115, 64.26; 213/41, 43; 403/16, 259; 411/383, 432, 433, 434, 916, 917

[56] References Cited

U.S. PATENT DOCUMENTS 3,412,870 11/1968 Rollins ........................... 188/317 X

FOREIGN PATENT DOCUMENTS

| 1180394 | 10/1964 | Fed. Rep. of Germany . | |
| 541703 | 8/1922 | France | 403/259 |
| 1074674 | 10/1954 | France . | |
| 2062702 | 6/1971 | France . | |
| 297202 | 9/1928 | United Kingdom . | |
| 579900 | 8/1946 | United Kingdom . | |
| 721222 | 1/1955 | United Kingdom . | |
| 914563 | 1/1963 | United Kingdom . | |
| 1266596 | 3/1972 | United Kingdom . | |
| 1344477 | 1/1974 | United Kingdom . | |
| 2093154 | 8/1982 | United Kingdom . | |

Primary Examiner—Andres Kashnikow
Assistant Examiner—Richard R. Diefendorf
Attorney, Agent, or Firm—Parkhurst & Oliff

[57] ABSTRACT

A railroad vehicle end-of-car center coupler includes a telescopic energy absorber comprising a hollow cylindrical plunger in a cylinder having one closed end. The plunger has an aperture in its inner end wall. A perforated metering tube is fixed in the closed end wall by a special fixing arrangement. It projects through the aperture and carries an annular piston head which slides in the bore of the plunger. A floating piston divides the interior of the plunger into a gas space and a liquid chamber. Four direct acting pressure relief valves are mounted in the piston head. Conduits through the tube connect their inlets to respective ones of four axially-spaced ports in the outer surface of the tube so that they all communicate with the annular chamber that surrounds the tube within the plunger when the absorber is compressed and so that they are progressively cut-off from such communication during the final stages of extension of the absorber. The valves are designed to open when a predetermined pressure is established in the annular chamber.

6 Claims, 6 Drawing Figures

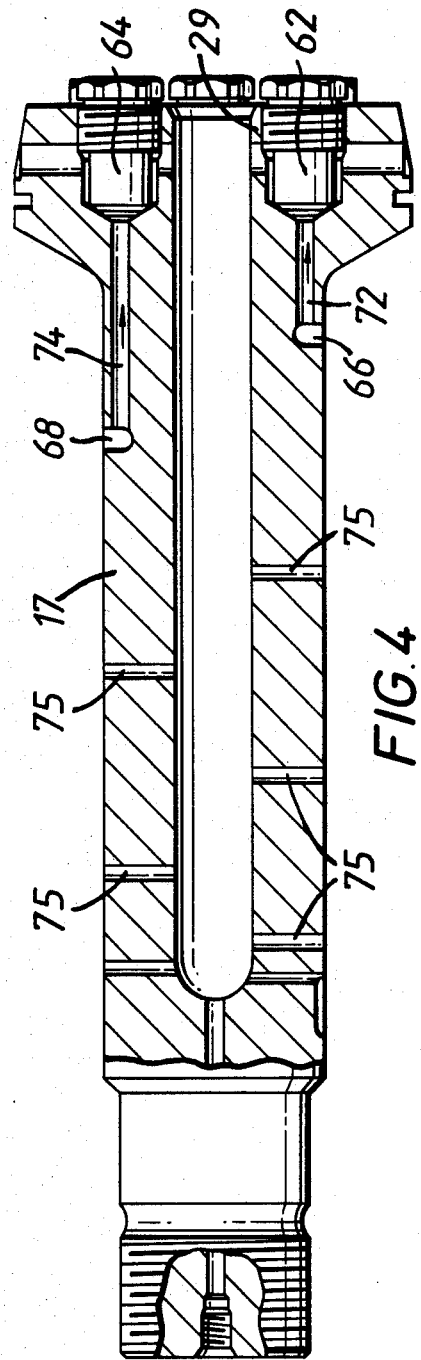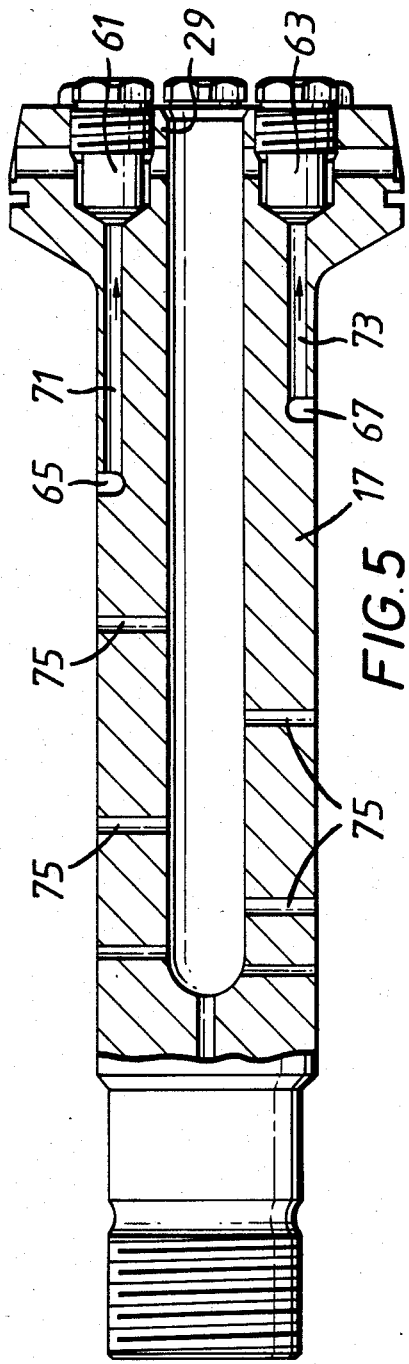

ENERGY ABSORBERS

DESCRIPTION

This invention relates to railroad vehicle end-of-car cushioning means comprising an energy absorber, for incorporation in railroad vehicle end-of-car centre couplers.

U.S. Pat. No. 3,412,870, which issued on Nov. 26, 1968 in the name of Dallas W Robbins, discloses end-of-car cushioning means for a railroad car comprising a hydro-pneumatic shock absorber which is arranged to provide buff and draft cushioning. It comprises a hollow plunger slidable in a closed ended cylinder and has an axially-hollow perforated metering tube which passes through an aperture in an end wall of the plunger. An annular piston head at the end of the tube within the plunger separates two liquid chambers which are in mutual communication via the bore and perforations of the tube. There are check valves in the annular piston head. The metering tube includes pressure relief and check valves at both its ends, those valves being provided to permit additional cushion travel and prevent overloading which might result from impacts occurring before the plunger has returned sufficiently to its extended position within the cylinder.

Liquid pressure that is likely to be established in the annular cylinder space that surrounds the tube between the hollow plunger and the closed end wall of the cylinder, is liable to be so great during a buff stroke that the check valve and relief valve at the end of the tube adjacent to the closed end of the cylinder will be forced out of that tube.

Some leakage between the two liquid chambers, past the annular piston head and through the check valves in the annular piston head, has to be expected in practice. That leakage can be designed to allow the additional cushion travel to occur in draft as is the case during operation of the shock absorber disclosed in British Patent Specification No. 1 344 477 which was published on Jan. 23, 1974 in the name of Alfred Teves, GmbH. Hence the proposed provision of the pressure relief valve at the end of the tube to which the annular piston head is fitted is an unnecessary complication.

The optimum arrangement of the perforations in the metering tube for buff is unsuitable for draft. Any compromise between the requirements of the arrangements of the perforations for buff and draft is unsatisfactory. An object of this invention is to provide a form of energy absorber appropriate for use in railroad vehicle end-of-car cushioning means which can have improved control in draft as well as optimum control in buff.

According to one aspect of this invention there is provided railroad vehicle end-of-car cushioning means comprising an energy absorber including a cylinder which is open at one end and closed at the other; a hollow plunger which is located slidably within the cylinder, which has an aperture in its end that is nearer to the closed end of the cylinder and which is closed at its other end, the aperture being at one end of a liquid containing chamber within the plunger; resilient means operable to oppose movement of the plunger into the cylinder and thereby to provide a recoil force; an annular piston head slidable in the liquid containing chamber and mounted at one end of a tube which projects from the closed end of the cylinder through the aperture within which it is a sliding fit, the central aperture of the annular piston head being in communication with a longitudinally extending passage formed by the interior of the tube, there being a plurality of radially extending apertures formed at axially spaced intervals along the tube, each aperture placing the interior of the tube in communication with one of the surrounding cylinder space and the chamber; and including a plurality of normally-closed valves operable to open to permit flow through them from the annular portion of the chamber that is formed between the annular piston head and the apertured end wall of the hollow plunger to the remainder of that chamber when a predetermined pressure is established in that annular chamber portion, each said normally-closed valve being mounted in structure which comprises said annular piston head and tube, and having an inlet which communicates via respective conduit means in said structure with a respective one of a plurality of ports which are formed in the outer surface of the tube at axially-spaced intervals along the tube such that they are progressively cut-off from communication with the annular chamber portion during extension of the energy absorber.

According to another aspect of this invention there is provided a fixing arrangement whereby an elongate member is fixed within an aperture in a wall through which the member extends and whereby a tensile load is applied to the member, the fixing arrangement comprising abutment means on the member in abutment with one surface of the wall at the edge of the aperture therein, a nut which is screwed onto a projecting end portion of the member on the other side of the wall, a spacer between the nut and that other side of the wall, and a plurality of circumferentially spaced bolts which are screwed into suitably located tapped holes through the nut so that they abut the annular spacer and urge it against the wall.

One form of energy absorber in which this invention is embodied fitted as a replacement unit in structure of a railway vehicle end of car centre coupler is described now by way of example with referece to the accompanying drawings, of which:

FIGS. 4 and 5 are sections of the metering tube on lines IV—IV and V—V respectively in FIG. 3.

Figure 2:
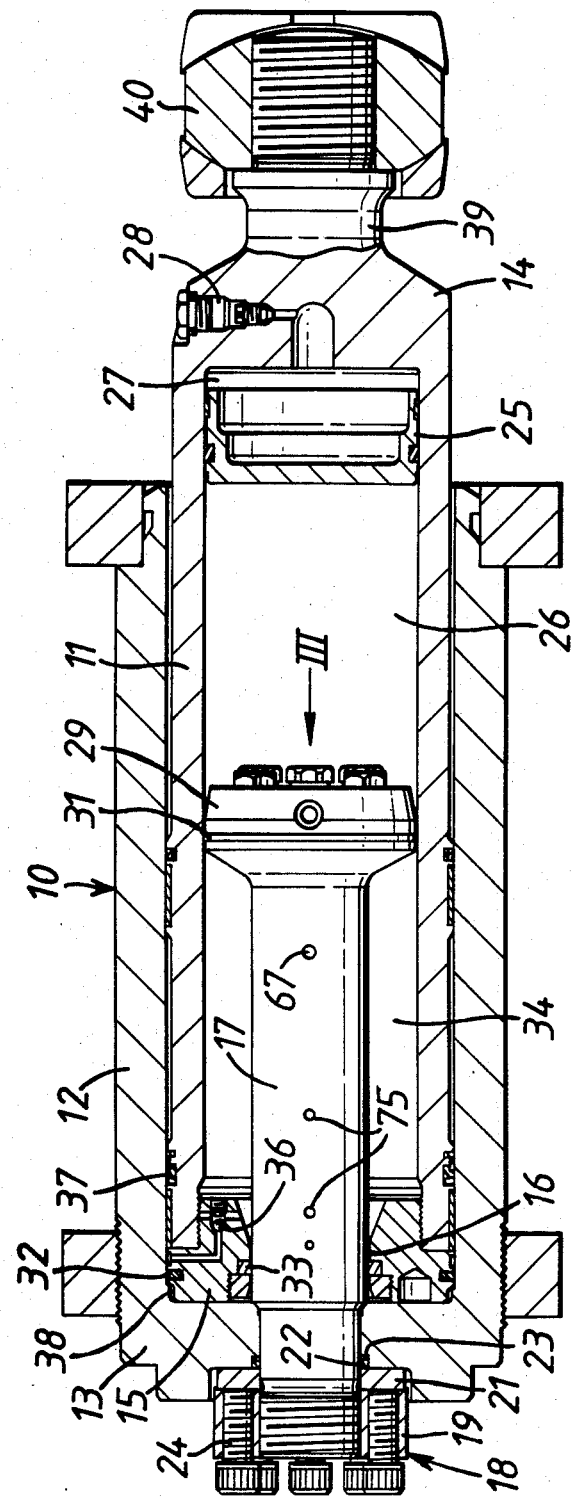
FIG. 2 is a transverse cross-section of the energy absorber that is incorporated in the coupler shown in FIG. 1.

FIG. 2 shows that the energy absorber 10 comprises a hollow cylindrical plunger 11 mounted in a cylinder 12. The latter is closed at one end 13. The plunger 11 is closed at its outer end 14 and at its inner end has an end wall 15 in which is formed a central aperture 16.

A metering tube 17 is fixed to the closed end wall 13 of the cylinder 12 and extends through the aperture 16. A special fixing arrangement 18 is used to apply a tensile load to the end of the metering tube 17 which is sufficient to provide the necessary degree of sealing against seepage of liquid from within the cylinder 12. The sealing arrangement comprises a nut 19 which is screwed onto a solid projecting end portion of the metering tube 17 outside the cylinder 12, an annular spacer 21 which is clamped between the nut 19 and the outer surface of the closed end wall 13, an O-ring seal 22 which is trapped in an annular recess 23 in the end wall 13 and compressed by the spacer 21 so as to sealingly engage the outer surface of the metering tube 17 that it surrounds, and a plurality of circumferentially spaced jack bolts 24. The latter are screwed into suitably located tapped holes through the nut 19 so that they abut the annular spacer 21 and urge it against the end wall 13.

A floating piston 25 slides in the bore of the plunger 11 and separates a liquid containing chamber 26, which is formed within the plunger 11, from the remainder of the interior of the plunger 11 which extends between the floating piston 25 and the closed outer end 14 and which comprises a gas containing space 27. An inflation valve 28 is provided in the closed outer end 14 of the plunger 11 for filling the space 27 with compressed gas, such as nitrogen, on assembly of the cushioning device 10.

The metering tube 17 is formed with an annular piston head 29 within the hollow plunger 11. The piston head 29 carries a piston ring 31 which engages the bore of the hollow plunger 11. The latter carries two piston rings, one, 32, in the outer cylindrical surface of the inner end wall 15, and the other, 33, in the peripheral surface of the aperture 16. The piston ring 32 is engaged with the cylindrical surface of the cylinder 12. The piston ring 33 is engaged with the outer surface of the metering tube 17. Hence an annular chamber 34 is formed between the piston head 29 and the end wall 15.

Figure 3:
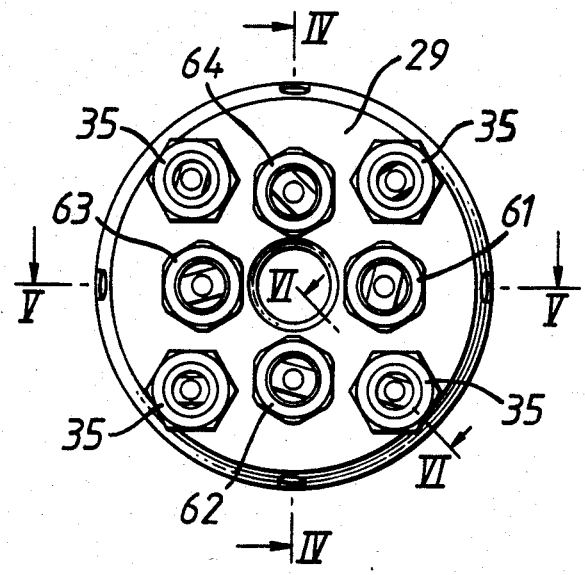
FIG. 3 is an end view on Arrow III in FIG. 2 of the metering tube of the energy absorber shown in FIG. 1.
Figure 6:
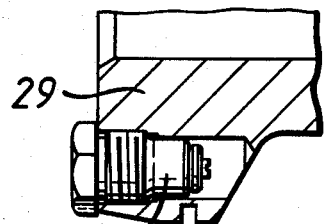
FIG. 6 is a sectioned fragment of the metering tube on the line VI—VI in FIG. 3.

FIG. 3 shows that there are four one-way valves 35 in the annular piston head 29 which allow liquid flow from the chamber 26 into the annular chamber 34 and which prevent flow out of the chamber 34 to the chamber 26. A one-way valve 36 (see FIG. 2) in the hollow plunger 11 adjacent the inner end wall 15 communicates with the outer surface of the hollow plunger 11 between the piston ring 32 and a packing ring seal 37 and protects the latter from excessive liquid pressures by allowing liquid flow into the annular chamber 34 whilst preventing liquid flow in the opposite direction from the annular chamber 34.

FIGS. 3, 4 and 5 show that four direct-acting normally-closed pressure relief valves 61, 62, 63 and 64 are fitted into the annular piston head 29. Each of them is designed to open automatically when a predetermined pressure is generated in the annular chamber 34 and they are all designed to be opened by establishment of the same pressure. Each pressure relief valve 61-64 has an inlet which communicates with a respective port 65-68 in the outer surface of the tube 17 via a respective axially-extending conduit 71-74. The ports 65-68 are formed at axially-spaced intervals along the tube 17. FIGS. 4 and 5 show that each pressure relief valve also has a valve member which is seated in a conical valve seat whereby to close communication between the respective inlet and an opposed pair of radial outlets which respectively communicate with the bore of the tube 17 and with the surface of the annular piston head 29 that bounds the chamber 26. Each valve member would be biassed to be seated and would be unseated to allow communication between the respective inlet and radial outlets when it is subjected to the predetermined pressure that is applied to it at the respective inlet having been established within the annular chamber 34 and transmitted to it via its respective port 65-68 that is in communication with the annular chamber 34, and its respective conduit 71-74.

The metering tube 17 is formed with a series of holes 75 which extend radially through its tubular wall and are at spaced locations along its length. The holes 75 allow for flow of liquid between the bore of the metering tube 17 and the annular chamber 34 and a liquid compression chamber 38 formed within the cylinder 12 between the plunger 11 and the end wall 13 of the cylinder 12. The location and cross-section of the holes 75 is selected to provide desired metering of such liquid flow and thus to control movement of the plunger 11 within the cylinder 12, especially movement in buff (that is to say towards the closed end wall 13 of the cylinder 12).

The closed end 14 of the hollow plunger 11 has an integral, external, axially-projecting tongue 39 which has a spherical coupler head 40 formed on it.

Figure 1:
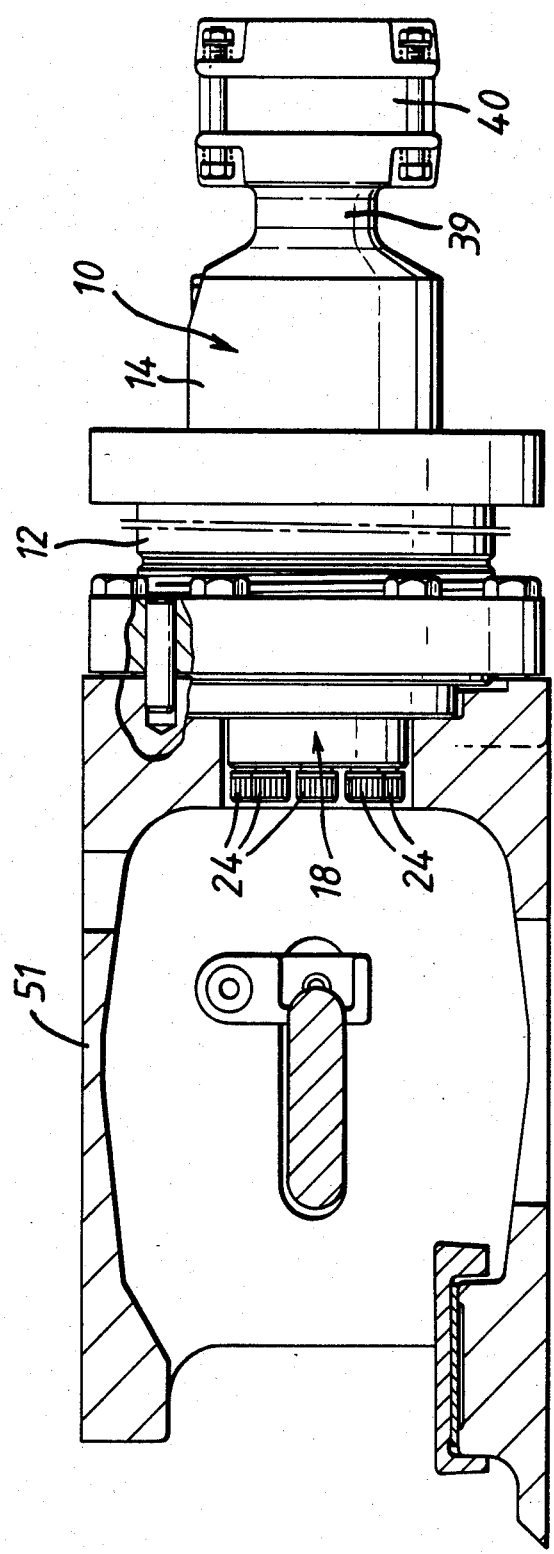
FIG. 1 is a partially sectioned side view of the car coupler.

FIG. 1 shows the energy absorber 10 installed in a fabricated metal casing 51 which is mounted at the end of the railcar in the centre for limited movement forwards and backwards relative to the railcar. The cylinder 12 is fixed to the casing 51 so that the coupler structure is supported outside the casing 51 for coupling with a cooperating coupler of another centre coupler arrangement mounted at the end of another railcar.

The energy absorber 10 is variously subjected to lengthwise compression and extension between fixed end stops (not shown) during movements of a train into which the railcar is coupled. Lengthwise compression (or buff) of the energy absorber 10, causes movement of the plunger 11 towards the end wall 13 of the cylinder 12 which compresses liquid in the chamber 38 and displaces it through the holes 75 in the metering tube 17 that are in communication with the chamber 38 to the chamber at lower pressure formed by the bore of the metering tube 17, the chamber 26 and the annular chamber 34, such liquid entering the annular chamber 34 via the one-way valves 35 and the holes 75 in the metering tube 17 that communicate with the annular chamber 34. It will be understood that the number of holes 75 in the metering tube 17 that communicate with the chamber 38 progressively reduces and the number of holes in the metering tube 17 that communicate with the annular chamber 34 progressively increases as the plunger 11 approaches the end wall 13. A limited amount of liquid that passes the piston ring 32 is also allowed to enter the annular chamber 34 via the other one-way valve 36. Such liquid entering the chamber 26 displaces the hollow piston 25 towards the outer plunger end wall 14 so that gas within the space 27 is compressed.

The compressed gas within the chamber 27 provides a recoil force which causes extension of the energy absorber 10 to its maximum length when the compressive load is removed.

Lengthwise extension (or draft) of the energy absorber 10, from something less than its maximum length, in reaction to a tensile load applied by the action of the train, causes movement of the inner end wall 15 of the plunger 11 towards the annular piston head 29. Liquid is forced out of the annular chamber 34 through the holes 75 in the metering tube 17 that communicate with that chamber, due to the action of the one-way valves 35 and 36 and of the pressure relief valves 61-64 providing the pressure in the annular chamber 34 does not rise to the predetermined level at which the latter are caused to open. Since the increase in volume of the chamber 38 is greater than the reduction in volume of the annular chamber 34, the floating piston 25 moves towards the metering tube 17 to displace further liquid into the chamber 38 through the holes 75 in the tube 17 that communicate with the chamber 38. It will be understood that such movement of the floating piston 25 is caused by expansion of the compressed gas in the chamber 27.

Energy is absorbed by the restricted flow of liquid through the holes 75 in the metering tube 17. Also energy is absorbed during a single stroke of the energy absorber 10 be it extension or compression of the absorber 10. Extension of the energy absorber 10 due to the recoil force generated by expansion of compressed gas in the chamber 27 is damped by the flow restricting action of the holes 75 in the metering tube 17 through which the liquid is forced. A certain amount of leakage passed the piston ring 31 and through the one-way valves 35 allows for full extension of the absorber 10 until the end wall 15 of the plunger 11 abuts the piston head 29.

Should the load exerted in draft on the absorber 10 by a train, which causes extension of the absorber 10, be such as to cause a rise in pressure in the annular chamber 34 which causes the pressure relief valves 61-64 to open, flow from that chamber 34 through the valves 61-64 will occur in addition to that through any of the holes 75 that communicate with the chamber 34 at that instance. The inlets of the direct-acting normally-closed pressure relief valves 61-64 in the metering tube 17 are progressively cut-off from communication with the annular chamber 34 via the respective conduits 71-74 and ports 65-68 as the end wall 15 of the plunger 11 approaches the annular piston head 29 during extension of the energy absorber 10 so that the number of the pressure relief valves 61-64 that might open is reduced during the final stages of such extension. Energy will be absorbed by the passage of liquid through any of the pressure relief valves 61-64. The arrangement whereby the plurality of pressure-relief valves are progressively cut-off from communication with the annular chamber 34 as the absorber 10 extends and the manner in which those valves function leads to there being a facility for retarding movement of the plunger 11 in draft which increases both as the draft forces increase and as the plunger 11 approaches the end of its stroke.

The absorber 10 can be provided with extension force characteristics which vary as the absorber extends if the pressure-relief valves 61-64 are set to open at different pressures within the annular chamber 34 as desired.

In another installation, instead of having the spherical coupler head 40 on it, the tongue 39 is formed with a lateral bore which accommodates a centre pin which projects from it at either end. The centre pin is located in the bore of a central annular part of a ball bushing. The outer annular part of the ball bushing is fitted into the lateral bore wherein it is located by two circlips which are disposed symmetrically about the longitudinal centreline of the energy absorber 10. A collar is fitted onto the centre pin at either end and the two collars which abut the respective end of the ball bushing central annular part are bolted together to move as one with the centre pin. The centre pin is cut away at either end, as is the respective collar, to form a flat which faces the cylinder 12. Each end portion of the centre pin and the respective collar are fitted into a respective one of an opposed pair of alcoves formed in a conventional generally C-shaped centre coupler structure whereby the latter is mounted on the hollow plunger 11 for limited universal movement relative to the plunger 11.

The cylinder 12 is fixed inside the casing in this other installation, whilst the plunger 11 projects through an aperture at the outer end of the casing, the lateral bore, and hence the centre pin being substantially horizontal so that the coupler structure is supported outside the casing for coupling with a cooperating coupler of another centre coupler arrangement mounted at the end of another railcar.

In preparing the energy absorber 10 for fitting in the casing as a replacement unit in this other installation, a screw thread was formed on the outer surface of the cylinder 12 at its outer end. The outer end of the originally fitted casing was cut away to free the originally fitted energy absorber which was then removed. A portion of the wall of the casing was cut away to form an aperture. An abutment was fixed, eg. by welding, to the inner surface of the casing between the aperture and the open end.

A nut having a thread which mates with the screw thread, was inserted into the casing through the open end of the casing until its inner end wall 13 abutted a surface formed by the casing at the inner end of its interior, the plane surface portion of the cylinder 12 being passed through the central aperture of the nut. The latter was then screwed onto the screw thread, brought into contact with the inner face of the abutment and tightened up so that the cylinder 12 is fixably located within the casing. A lever, which was inserted through the aperture and engaged in a hole formed in the nut, was urged to turn the nut and tighten it up.

We claim:

1. Railroad vehicle end-of-car cushioning means comprising an energy absorber including a cylinder which is open at one end and closed at the other end; a hollow plunger which is located slidably within the cylinder, said hollow plunger having end walls and an aperture in the end wall that is nearer to the closed end of the cylinder and said hollow plunger being closed at its other end wall; the aperture being at one end of a liquid containing chamber within the plunger; resilient means operable to oppose movement of the plunger into the cylinder and thereby to provide a recoil force; an annular piston head slidable in the liquid containing chamber and mounted at one end of a tube which projects from the closed end of the cylinder through a surrounding cylinder space and the aperture within which it is a sliding fit, the annular piston head having a central aperture in communication with a longitudinally extending passage formed by the interior of the tube, there being a plurality of radially extending apertures formed at axially spaced intervals along the tube, each aperture placing the interior of the tube in communication with one of the surrounding cylinder space and the chamber; and including a plurality of normally-closed valves operable to open to permit flow through them from the annular portion of the chamber that is formed between the annular piston head and the end wall of the hollow plunger in which the aperture is formed to the remainder of that chamber when a predetermined pressure is established in that annular chamber portion, each said normally-closed valve being mounted in a structure which comprises said annular piston head and tube, and having an inlet which communicates via respective conduit means in said structure with a respective one of a plurality of ports which are formed in the outer surface of the tube at axially-spaced intervals along the tube such that they are progressively cut-off from communication with the annular chamber portion during extension of the energy absorber.

2. Railroad vehicle end-of-car cushioning means according to claim 1, wherein said normally-closed valves are housed within the annular piston head.

3. Railroad vehicle end-of-car cushioning means according to claim 1, wherein the tube extends through an aperture in a wall at the closed end of the cylinder in a fluid tight manner and is fixed to the wall at the closed end of the cylinder by a fixing arrangement, the fixing arrangement comprising means on the tube in abutment with the inner surface of the wall at the closed end at the edge of the aperture therein, a nut which is screwed onto a projecting end portion of the tube outside the cylinder, a spacer between the nut and the wall at the closed end of the cylinder, a sealing ring which is trapped in an annular recess in the outer surface of the wall at the closed end around the aperture therein, and a plurality of circumferentially spaced bolts which are screwed into suitably located tapped holes through the nut so that they abut the spacer and urge it against the wall at the closed end so as to compress the sealing ring and urge it into sealing engagement with the outer surface of the tube.

4. Railroad vehicle end-of-car cushioning means according to claim 1, including one-way valving operable to allow liquid flow into the annular portion of the chamber that is formed between the annular piston head and the apertured end wall of the hollow plunger.

5. Railroad vehicle end-of-car cushioning means according to claim 4, wherein said one-way valving comprises at least one one-way valve in the structure that comprises the annular piston head and the tube.

6. Railroad vehicle end-of-car cushioning means according to claim 5, wherein said one-way valving includes at least one one-way valve in the hollow plunger.

* * * * *